United States Patent [19]

Tomlin

[11] 4,105,296
[45] Aug. 8, 1978

[54] VEHICLE REAR-VIEW MIRROR WITH SUPPORT ARM HAVING INDEXING MEANS AT BOTH ENDS

[75] Inventor: Robert Derrick Tomlin, Hampton Hill, England

[73] Assignee: Magnatex Limited, Hounslow, England

[21] Appl. No.: 743,628

[22] Filed: Nov. 22, 1976

[51] Int. Cl.² .......................... G02B 7/18; A47G 1/24
[52] U.S. Cl. ..................................... 350/307; 248/478
[58] Field of Search ................ 350/307, 304; 248/478, 248/477, 481, 482, 484–487; 74/501 M

[56] References Cited

U.S. PATENT DOCUMENTS

| 1,932,697 | 10/1933 | Jankovic | 248/478 |
| 2,413,894 | 1/1947 | Sorensen | 350/307 |
| 2,465,751 | 3/1949 | Robins | 248/481 |
| 2,533,475 | 12/1950 | Koonter | 248/478 |
| 3,977,645 | 8/1976 | Deely | 248/484 |

FOREIGN PATENT DOCUMENTS

| 1,278,865 | 6/1972 | United Kingdom | 350/307 |
| 1,004,316 | 9/1965 | United Kingdom | 248/481 |
| 746,275 | 3/1956 | United Kingdom | 248/478 |
| 658,679 | 10/1951 | United Kingdom | 350/307 |

Primary Examiner—Jon W. Henry
Attorney, Agent, or Firm—Brisebois & Kruger

[57] ABSTRACT

A vehicle rear-view mirror assembly for use on vehicles which, at times, are used for towing trailers of greater width than the vehicle, has a mirror supporting arm mounted on a base part adapted to be secured to a front fender of a vehicle so as to be turnable about a substantially vertical axis relative to the base part and from which the arm extends radially, and interengaging portions on the supporting arm and base part which are resiliently urged together so that the supporting arm can be located around said axis in different indexing positions of which two are disposed approximately at right angles to each other. A mirror head is mounted at the free end of said arm for adjustment about another substantially vertical axis through an angle approximately equal to the angle between said two indexing positions and can be held in its adjusted position relative to the arm.

3 Claims, 3 Drawing Figures

VEHICLE REAR-VIEW MIRROR WITH SUPPORT ARM HAVING INDEXING MEANS AT BOTH ENDS

BACKGROUND OF THE INVENTION

1. Field of the Invention

This invention relates to vehicle rear-view mirror assemblies for vehicles, particularly cars, which, at times, are used for towing caravans or trailers and which may be extended from an inner position for normal rear viewing into an outer position to permit rear viewing when the vehicle is towing a caravan or trailer.

2. Description of the Prior Art

Caravan or trailer mirrors in which the driver's field of view can be extended from a normal rear viewing position to a position which permits rear viewing when the vehicle is towing a caravan or trailer are known. In one mirror construction the mirror supporting arm is made in two telescoping parts but such mirrors are expensive to make. In another construction disclosed in British Patent Specification No. 871,782, the mirror supporting arm is made in two parts which are hinged together but such mirrors are unsightly. A further mirror construction comprising two arms is disclosed in British Patent Specification No. 794,962 but this construction is complicated and is expensive to make.

Mirrors which clip on to normal rear view mirrors and replacement extension arms are also known to extend the driver's field of view beyond a caravan or trailer being towed by the vehicle but these clip-on mirrors and extension arms are easily lost.

Rear-view mirrors which are swingable towards the vehicle from an outer normal rear viewing position are also known from Bristish Patent Specification No's. 658,679, 1,162,618 and 1,278,865 but such mirrors are not suitable also for use as a caravan or trailer mirror.

SUMMARY OF THE INVENTION

It is an object of the present invention to provide an improved rear-view mirror construction suitable both for normal rear viewing and rear viewing when the vehicle is towing a caravan or trailer, in which the above disadvantages are avoided, which is simple and inexpensive to make, easy to adjust and of pleasing appearance.

The invention consists in a vehicle rear-view mirror assembly for use on vehicles which, at times, are used for towing caravans or trailers of greater width than the vehicle, the mirror assembly being adjustable to both an inner position for rear-viewing when a caravan or trailer is not being towed and an outer position in which the mirror is extended outwardly for rear viewing when a caravan or trailer is being towed and comprising a mirror supporting arm mounted on a base part, adapted to be secured to a front wing or fender of a vehicle, so as to be turnable about a substantially vertical axis relative to the base part, and from which the arm extends radially, the supporting arm and base part having interengaging surface portions which are resiliently urged together so that the supporting arm can be located around said axis in different indexing positions of which two are disposed approximately at right angles to each other, and a mirror head mounted at the free end of said arm for adjustment about another substantially vertical axis through an angle approximately equal to the angle between said two indexing positions, means being provided for holding the mirror head in its adjusted position relative to the arm.

The invention also consists in a vehicle equipped with a rear-view mirror assembly as above set forth and secured to the front wing or fender of the vehicle wherein the mirror supporting arm extends radially from its axis of turning about the base part for such a distance that in one of its said two indexing positions the arm is located for normal rear viewing and in the other of its said two indexing positions the arm projects laterally from the vehicle for a greater distance than in its said one indexing position, and sufficiently to enable rear-viewing around a caravan or trailer to be towed by the vehicle.

BRIEF DESCRIPTION OF THE DRAWINGS

An embodiment of the invention will now be described with reference to the accompanying drawings in which.

DESCRIPTION OF THE PREFERRED EMBODIMENT

Figure 1:
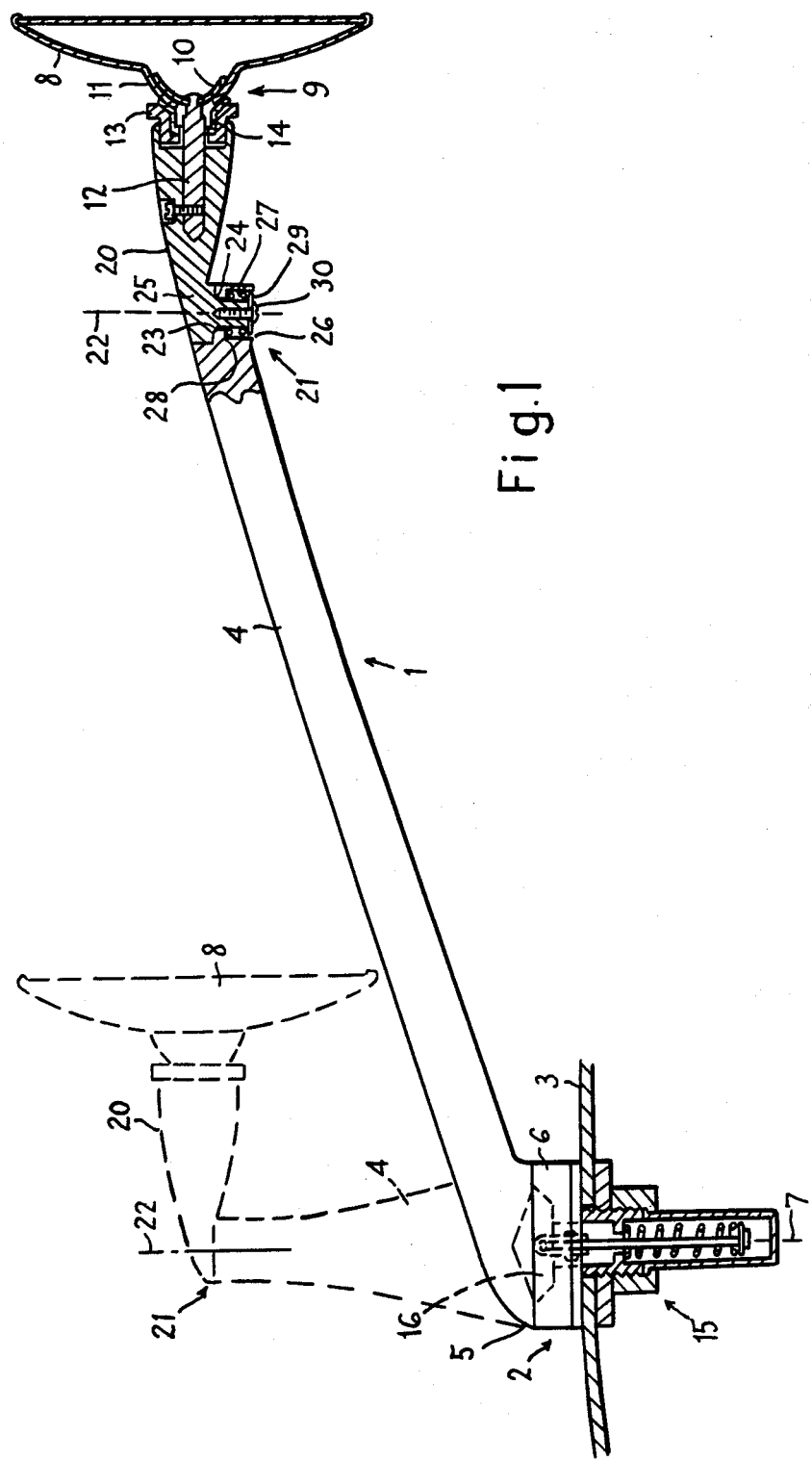
FIG. 1 is part-sectional side elevation of a rear-view mirror assembly fixed to a front wing of a car.
Figure 2:
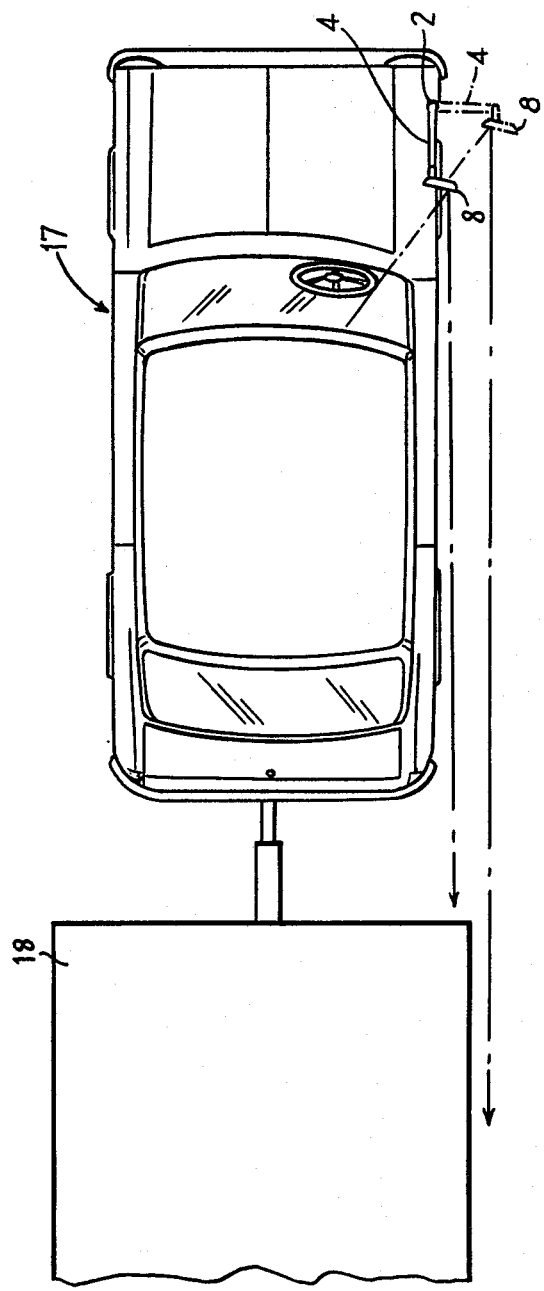
FIG. 2 is a plan view of a car with a caravan in tow and of the assembly of FIG. 1 fixed to the car.
Figure 3:
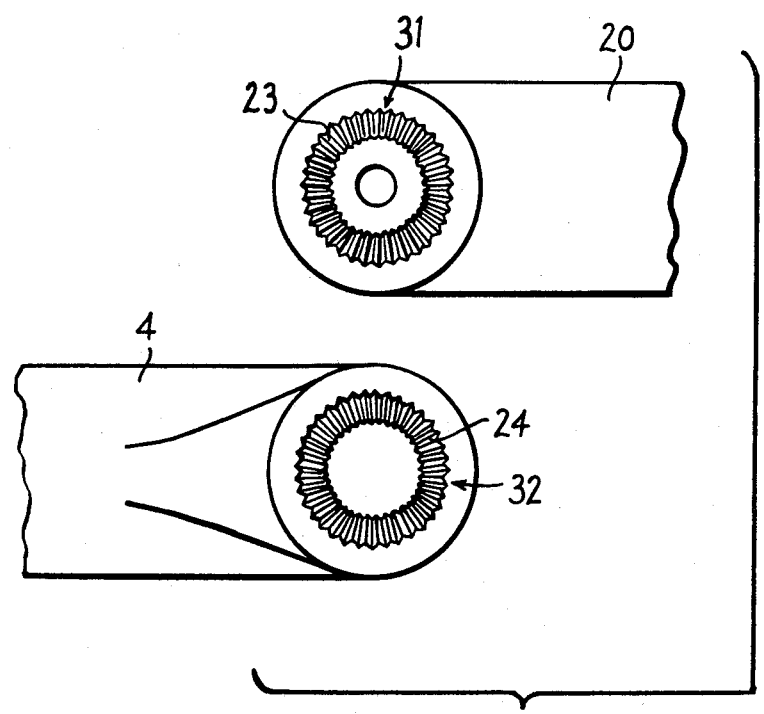
FIG. 3 illustrates, to an enlarged scale, parts of the arm proper and arm end portion disassembled to show the indexing means therebetween with the arm end portion turned through 180° about its axis with respect to the arm proper.

In the drawings a vehicle rear view mirror assembly, generally indicated at 1, comprises a base part 2 which is secured to the front wing 3 of a vehicle, on the driver's side. A long, rigid, mirror supporting arm or stanchion 4 is mounted at its end portion 5 on a portion 6 of the base part 2 so as to be turnable about a substantially vertical axis 7 and located relative to the base part in at least two indexing positions shown in full and dash-dot lines respectively and disposed at approximately right angles to each other. The arm 4 extends radially from the axis 7 for such a distance that when the arm 4 is located in the dash-dot line position it will project laterally from the car 17 (FIG. 2) sufficiently to enable rear viewing around the caravan 18 (FIG. 2).

A mirror head 8 is adjustably mounted at the free end of the arm 4 on an end portion 20 thereof by means of a tightenable ball joint 9 which is of the kind described in British Patent Specification No. 1004316. Such a ball joint is capable of being tightened so that it will not be loosened by forces applied on the mirror head 8 and comprises a ball member 10 which is adapted to fit into a ball socket 11 and which comprises a threaded spigot 12 fitted into a complementary passage in the free end of the arm end portion 20 so that it cannot rotate. A nut 13 threaded on the spigot 12 cooperates with a clamping member 14 which is non-rotatably mounted on the spigot 12 so that by tightening the nut the wall of the ball socket is clamped between the ball member and the clamping member. The arm end portion 20 is connected to the arm proper by a joint 21 for adjustment of the mirror head with respect to the arm proper about a substantially vertical axis 22 through an angle approximately equal to the angle between the two indexing positions. The joint 21 has frusto-conical joint surfaces 23 and 24 on an angled projection 25 of the arm end portion 20 and the wall of a transverse passage 26 in the supporting arm proper adjacent its end respectively.

The joint surfaces 23 and 24 consist of respective rings of serrations 31 and 32 which are urged into engagement by a compression spring 27, enabling the arm end portion 20 and thus the mirror head to be located in a plurality of indexing positions. There are conveniently thirtysix serrations in each ring, the serrations having sloping sides to enable the end portion 20 and arm proper to be turned relative to each other against the spring pressure. The spring 27 is compressed between an annular shoulder 28 on the wall of the passage 26 and a retaining washer 29 on an adjusting screw 30 screwed into a tapped bore in the projection 25. The spring pressure is adjusted by turning the screw 30. The ball socket 11 of the joint 9 is located in a offset position on the back of the mirror head 8.

The arm 4 is connected to the base part 2 by a flexible joint generally indicated at 15, which is basically of the kind described in British Patent Specification No. 746,275. With such a joint the mirror supporting arm has four indexing positions which are spaced-apart from each other by approximately 90°. The flexible joint 15 comprises a frustopyramidal portion 16 on the end portion 5 of the arm 4 and engaging in a similarly shaped cavity in the portion 6 of the base part 2. The interengaging surface portions of the arm and base part are urged together by a spring to locate the arm in each of the four indexing positions. In the illustrated full line position (FIG. 2), the arm 4 is in an inner indexing position in which it extends generally in the direction of the towing vehicle and the plane of the face of the mirror proper is substantially at right angles to the direction of the arm 4. The full line position of the assembly provides for normal rear-viewing as will be apparent from FIG. 2 in which the mirror enables rear viewing beyond the offside limits of the car 17 but does not permit the driver a rear view around the wider caravan 18.

In order to permit rear-viewing when towing the caravan 18, the arm 4 is swung or pivoted outwardly through approximately 90° into the dash-dot line position of the arm 4 (FIG. 2). The arm portion 20 with the mirror head 8 is then turned through apprxoximately 90° about the substantially vertical axis 22 of the joint 21. Fine adjustments of the orientation of the mirror head can be carried out in both horizontal and vertical directions about the ball member 10 of the joint to obtain an optimum viewing position. In the dash-dot line position the plane of the mirror face extends in substantially the same direction as the direction of the arm 4 which itself extends substantially at right angles to the direction of the vehicle. When the caravan 18 is uncoupled from the car 17 it is a simple matter to swing the arm and adjust the mirror head 8 into the full line position for normal rear viewing.

If the driver wishes to have the position of the mirror slightly offset in the normal position for rear viewing, the mirror assembly can be fixed to the vehicle to locate the arm in this position. When the arm is pivoted into the position for viewing with a towed vehicle although this position will be slightly offset relative to the usual position, compensation can be effected by adjusting the orientation of the mirror proper about the axis of the joint 21.

It will be appreciated that the rear-view mirror assembly described has no loose or spare parts.

Whilst a particular embodiment has been described various modifications may be made without departing from the scope of the invention as defined in the appended claims. For example, the flexible joint 15 and joint 21 may be replaced by other forms of joints capable of providing indexed positions of the arm 4 and arm portion 20. For example in the case of the joint 15 the end and base portions 5 and 6 may be provided with interengaging rings of serrations instead of the portion 16 and corresponding cavity in the portion 6. Such serrations provide further indexing positions for the arm 4 so that depending on the width of the towed vehicle the arm may be turned from the indexing position for normal rear viewing through an angle which is less than or greater than 90° in which case the arm end portion 20 also would be turned through a similar angle.

I claim:

1. A vehicle rear-view mirror assembly for fitting externally to a vehicle and which is selectively adjustable to extend beyond a normal rear viewing position to a position in which a driver's field of view extends beyond a side of a trailer of greater width than the vehicle which is towing the trailer, said mirror assembly comprising:
   (a) a base part comprising means for securing said base part to a front fender of a vehicle;
   (b) an elongate, rigid, mirror supporting arm;
   (c) means mounting said supporting arm, at one end thereof, on and extending radially of said base part for turning about a substantially vertical axis relative to the base part;
   (d) interengaging surface portions on said supporting arm and base part;
   (e) complementary indexing means on said interengaging portions respectively and defining a plurality of indexing positions extending around said axis and of which two indexing positions are disposed approximately at right angles to each other;
   (f) means resiliently urging said interengaging portions together so that the supporting arm can be located around said axis in different ones of said indexing positions;
   (g) a mirror head mounted at the free end of said arm on an end portion thereof,
   (h) joint means connecting said end portion to the supporting arm proper for adjusting the mirror head about another substantially vertical axis through an angle approximately equal to the angle between said two indexing positions,
   (i) said joint means being provided with indexing means defining a plurality of indexing positions for locating the arm end portion in different ones of a plurality of indexing positions with respect to the arm proper, and
   (j) means for holding the mirror head in its adjusted position relative to the arm proper.

2. An assembly as claimed in claim 1, wherein the mirror head is adjustably mounted on the arm end portion by means of a tightenable ball joint.

3. A vehicle equipped with a rear-view mirror assembly as claimed in claim 1 and secured to a front fender of the vehicle, wherein said mirror supporting arm extends radially from its axis of turning about the base part for such a distance that in one of its said two indexing positions the arm extends generally in the direction of the vehicle and is located for normal rear-viewing and in the other of its said two indexing positions the arm projects outwardly from the vehicle for a greater distance than in said one indexing position and is located for rear viewing beyond the trailer.

* * * * *